(12) United States Patent
Shingala et al.

(10) Patent No.: US 12,204,423 B1
(45) Date of Patent: Jan. 21, 2025

(54) SYSTEM AND METHOD FOR VERIFYING A CROSS-CONNECTION OF LANES IN A MULTI-LANE ENVIRONMENT USING A SINGLE TESTBENCH

(71) Applicant: Cadence Design Systems, Inc., San Jose, CA (US)

(72) Inventors: Raj Vithalbhai Shingala, Gujarat (IN); Yeshavanth Ballekere Nagaraj, Bengaluru (IN)

(73) Assignee: Cadence Design Systems, Inc., San Jose, CA (US)

(*) Notice: Subject to any disclaimer, the term of this patent is extended or adjusted under 35 U.S.C. 154(b) by 19 days.

(21) Appl. No.: 18/304,586

(22) Filed: Apr. 21, 2023

(51) Int. Cl.
*G06F 13/42* (2006.01)
*G06F 11/22* (2006.01)

(52) U.S. Cl.
CPC ........ *G06F 11/221* (2013.01); *G06F 13/4221* (2013.01); *G06F 13/4282* (2013.01)

(58) Field of Classification Search
CPC . G06F 11/221; G06F 13/4221; G06F 13/4282
See application file for complete search history.

(56) References Cited

U.S. PATENT DOCUMENTS

| | | | | |
|---|---|---|---|---|
| 11,983,474 B1* | 5/2024 | Biswas | ............... | G06F 30/3323 |
| 12,117,960 B2* | 10/2024 | Lanka | ................ | G06F 13/4068 |
| 2008/0304579 A1* | 12/2008 | Parthasarathy | ..... | H04L 25/0292 375/257 |
| 2018/0027703 A1* | 1/2018 | Adiletta | ................... | G06F 3/064 |
| 2018/0196710 A1* | 7/2018 | Iyer | ........................ | H04L 1/0041 |
| 2019/0138470 A1* | 5/2019 | Li | ............................ | G06F 13/14 |
| 2019/0251005 A1* | 8/2019 | Guntoro | ................. | G06N 3/045 |
| 2021/0081288 A1* | 3/2021 | Das Sharma | ....... | G06F 13/4282 |
| 2024/0147957 A1* | 5/2024 | Baldi | ....................... | G08B 3/10 |

FOREIGN PATENT DOCUMENTS

| | | | | |
|---|---|---|---|---|
| CA | 2904659 A1 * | 10/2014 | ........... | H04L 49/101 |
| WO | WO-2018017241 A1 * | 1/2018 | ........... | G02B 6/3882 |

* cited by examiner

*Primary Examiner* — Matthew M Kim
*Assistant Examiner* — Indranil Chowdhury
(74) *Attorney, Agent, or Firm* — Mark H. Whittenberger; Holland & Knight LLP

(57) ABSTRACT

An approach for verifying a cross-connection of lanes in a multi-lane environment using a single testbench-is provided. The approach may include providing a physical receiver lane index associated with a local device and providing a physical transmitter lane index associated with a peer device. The approach may further include randomizing a number of connected receiver lanes associated with the local device and a number of connected receiver lanes associated with the peer device. The approach may further include randomizing the physical receiver lane index and the physical transmitter lane index to generate a unique cross connection including randomized values. The approach may also include assigning the randomized values to one or more randomized cross connection defines. The approach may further include passing the cross connection defines to the single testbench and verifying each possible cross connection using a protocol specific mechanism.

17 Claims, 5 Drawing Sheets

SYSTEM AND METHOD FOR VERIFYING A CROSS-CONNECTION OF LANES IN A MULTI-LANE ENVIRONMENT USING A SINGLE TESTBENCH

BACKGROUND

When printed circuit boards ("PCBs") are made with chips having high-speed interfaces, it is necessary to have all of the lanes be of the exact same length as it helps in keeping the intra-lane skew low and the slew rate of the signals the same on all lanes. In some cases, it may not be possible to make a one-to-one connection between two chips that are on either side of these high-speed interfaces. For example, the whole bus may be flipped because of the way chips are placed on the PCB. Lane X may be directly in front of Lane Y while attempting to perform a one-to-one connection. Hence, to take care of these kinds of practical challenges, many protocols allow for use of a cross-connection.

SUMMARY

In one or more embodiments of the present disclosure, a method for verifying a cross-connection of one or more lanes in a multi-lane environment using a single testbench is provided. The method may include providing a physical receiver lane index associated with a local device having one or more receiver lanes and providing a physical transmitter lane index associated with a peer device having one or more transmitter lanes. The method may further include randomizing a number of connected receiver lanes associated with the local device and a number of connected receiver lanes associated with the peer device. The method may further include randomizing the physical receiver lane index and the physical transmitter lane index to generate a unique cross connection including one or more randomized values. The method may also include assigning the one or more randomized values to one or more randomized cross connection defines. The method may further include passing the one or more cross connection defines to the single testbench and verifying each possible cross connection using a protocol specific mechanism.

One or more of the following features may be included. The multi-lane environment may include a serial/parallel interface allowing one or more cross-connections. The serial/parallel interface may be included within a protocol selected from the group consisting of PCIe, USB3.x, USB4, M-PHY, and D-PHY. Passing the one or more cross connection defines may include connecting at least one wire at the single testbench. Randomizing the physical receiver lane index and the physical transmitter lane index may include cyclic randomization. The method may further include providing an option to handle either all possible cross connections or most possible cross connections. A protocol specific parameter may be used to track coverage of a cross connection for a particular scenario verification.

In one or more embodiments of the present disclosure, another method for verifying a cross-connection of one or more lanes in a multi-lane environment using a single testbench is provided. The method may include providing a physical receiver lane index associated with a local device having one or more receiver lanes, wherein each lane in the physical receiver lane index is a unidirectional, single-signal, physical transmission channel used to transport information between two points. The method may also include randomizing a number of connected receiver lanes associated with the local device and a number of connected receiver lanes associated with the peer device. The method may further include providing a physical transmitter lane index associated with a peer device having one or more transmitter lanes, wherein each lane in the physical transmitter lane index is a unidirectional, single-signal, physical transmission channel used to transport information between two points. The method may further include automatically randomizing the physical receiver lane index and the physical transmitter lane index to generate a unique cross connection including one or more randomized values and automatically assigning the one or more randomized values to one or more randomized cross connection defines. The method may also include passing the one or more cross connection defines to the single testbench and verifying each possible cross connection using a protocol specific mechanism.

One or more of the following features may be included. The multi-lane environment may include a serial/parallel interface allowing one or more cross-connections. The serial/parallel interface may be included within a protocol selected from the group consisting of PCIe, USB3.x, USB4, M-PHY, and D-PHY. Passing the one or more cross connection defines may include connecting at least one wire at the single testbench. Randomizing the physical receiver lane index and the physical transmitter lane index may include cyclic randomization. The method may further include providing an option to handle either all possible cross connections or most possible cross connections. A protocol specific parameter may be used to track coverage of a cross connection for a particular scenario verification.

In yet another embodiment of the present disclosure a system for verifying a cross-connection of one or more lanes in a multi-lane environment using a single testbench is provided. The system may include a local device having one or more receiver lanes and a physical receiver lane index associated therewith and a peer device having one or more transmitter lanes and a physical transmitter lane index associated therewith. The system may further include at least one processor configured to randomize a number of connected receiver lanes associated with the local device and a number of connected receiver lanes associated with the peer device. The at least one processor may be further configured to randomize the physical receiver lane index and the physical transmitter lane index to generate a unique cross connection including one or more randomized values. The at least one processor may be further configured to assign the one or more randomized values to one or more randomized cross connection defines. The at least one processor may be further configured to pass the one or more cross connection defines to the single testbench and to verify each possible cross connection using a protocol specific mechanism.

One or more of the following features may be included. The multi-lane environment may include a serial/parallel interface allowing one or more cross-connections. The serial/parallel interface may be included within a protocol selected from the group consisting of PCIe, USB3.x, USB4, M-PHY, and D-PHY. Passing the one or more cross connection defines may include connecting at least one wire at the single testbench. Randomizing the physical receiver lane index and the physical transmitter lane index may include cyclic randomization. The method may further include providing an option to handle either all possible cross connections or most possible cross connections.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
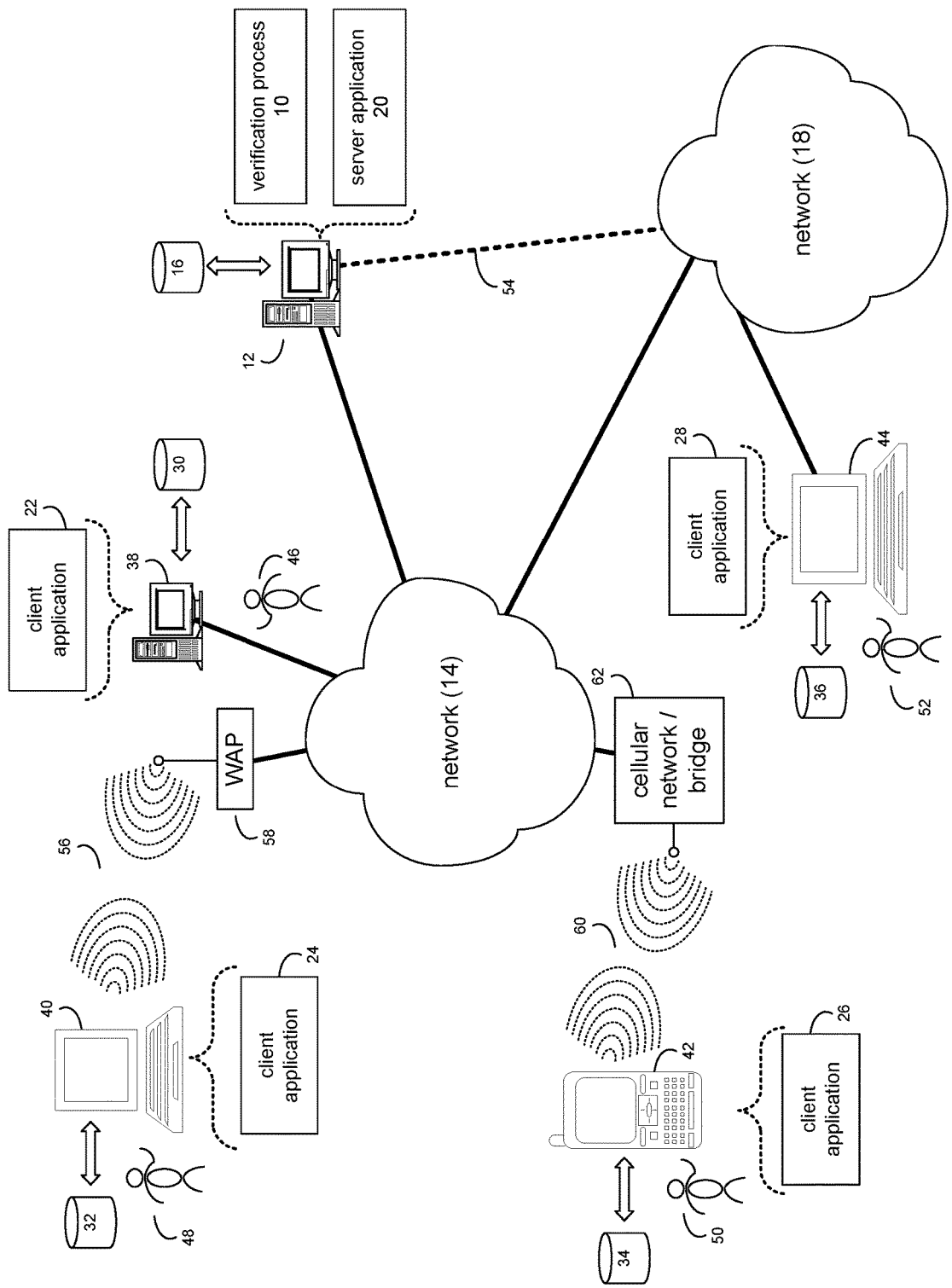
FIG. 1 diagrammatically depicts a verification process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. Like reference numerals in the drawings denote like elements.

An electronic design application (EDA) or integrated circuit layout application may include a set of technologies and features including, but not limited to: various graphical user interfaces allowing for schematic creation, a layout view, custom component placement, routing, module generation, layout optimization, and/or signal floorplanning. The techniques and features described by the present disclosure may be employed by or implemented in EDAs such as those available from the assignee of the present disclosure. The EDA may provide a canvas feature for main layout editing, various process design kits (PDK) including libraries and related data (e.g., model files, physical verification rule files, and/or control files for various tools), and database access that facilitate circuit design.

As SoC design complexity continues to increase, verification of the fully assembled chip with all its IP components, buses, and interfaces has become the critical path to tape out. Chip-level testbench creation, bus traffic generation, bus performance bottleneck identification, and data and cache coherency verification all lack automation. The effort required to complete these tasks is error prone and time consuming. Missed performance bottlenecks can expose architectural-level oversights late in the project and cover all corner cases for cache coherency across multiple parallel computation engines and can take months.

Embodiments may apply EDA applications that include IP-level verification automation, which may focus upon the chip level. Some EDA applications may include a suite of tools and libraries, each working seamlessly with simulation, emulation, and prototyping engines (such as those available from the Assignee of the present disclosure).

Referring to FIG. 1, there is shown a verification process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally, and/or alternatively, verification process 10 may reside on a client electronic device, such as a personal computer, notebook computer, personal digital assistant, or the like.

The instruction sets and subroutines of the verification process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS tm, Novell Webserver tm, or Apache Webserver tm, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Microsoft Exchange™ Server, etc. Server application 20 may interact with one or more client applications (e.g., client applications 22, 24, 26, 28) in order to execute verification process 10. Examples of client applications 22, 24, 26, 28 may include, but are not limited to, EDAs or design verification tools such as those available from the assignee of the present disclosure. These applications may also be executed by server computer 12. In some embodiments, verification process 10 may be a stand-alone application that interfaces with server application 20 or may be applets/applications that may be executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition, or as an alternative to being server-based applications residing on server computer 12, verification process 10 may be a client-side application residing on one or more client electronic devices 38, 40, 42, 44 (e.g., stored on storage devices 30, 32, 34, 36, respectively). As such, verification process 10 may be a stand-alone application that interfaces with a client application (e.g., client applications 22, 24, 26, 28), or may be applets/applications that may be executed within a client application. As such, verification process 10 may be a client-side process, server-side process, or hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize the EDA to create an electronic design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, verification process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple IOS, ANDROID, or a custom operating system.

Figure 2A:
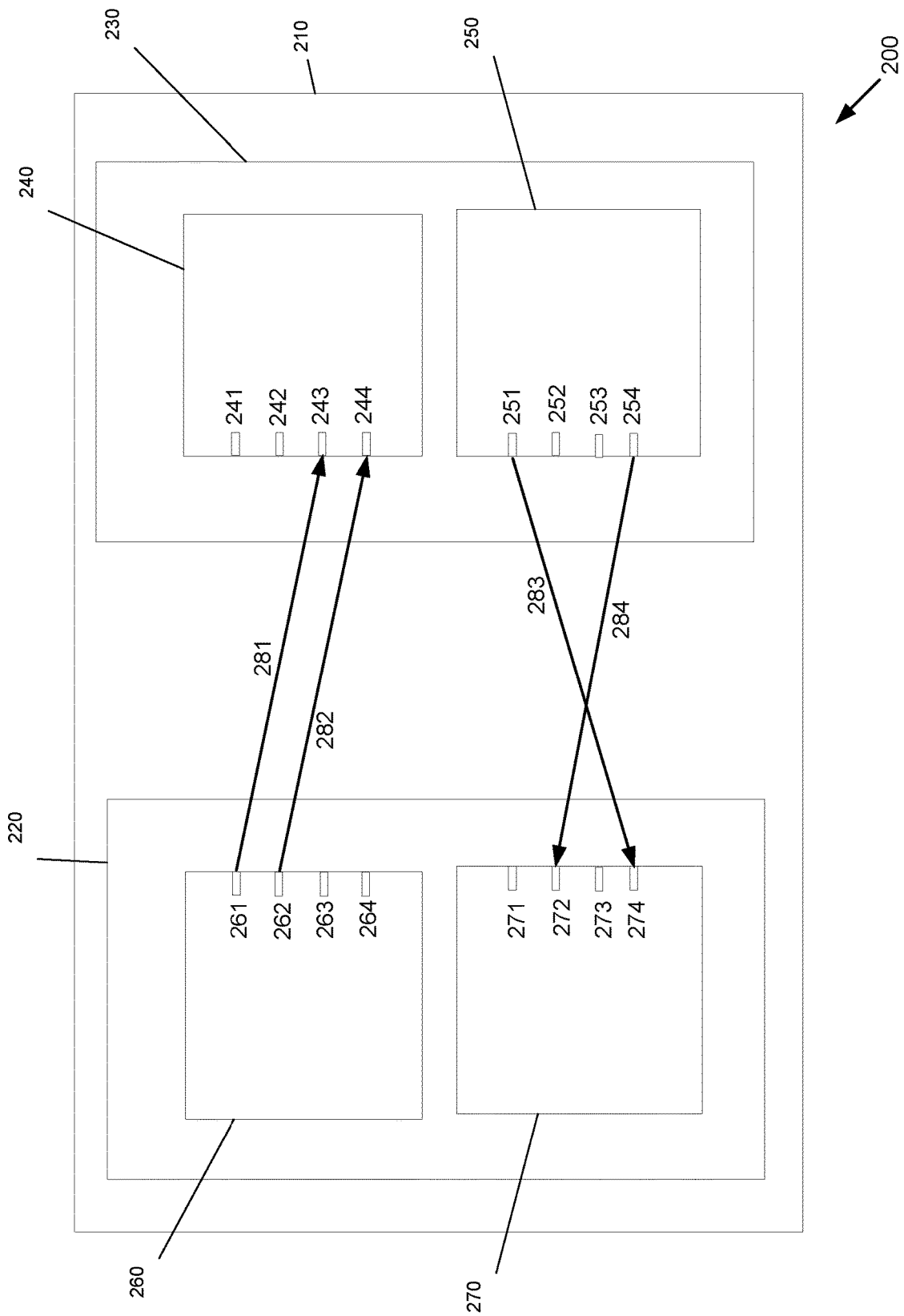
FIG. 2A illustrates a physical lane cross connection in accordance with embodiments the present disclosure.
Figure 2B:
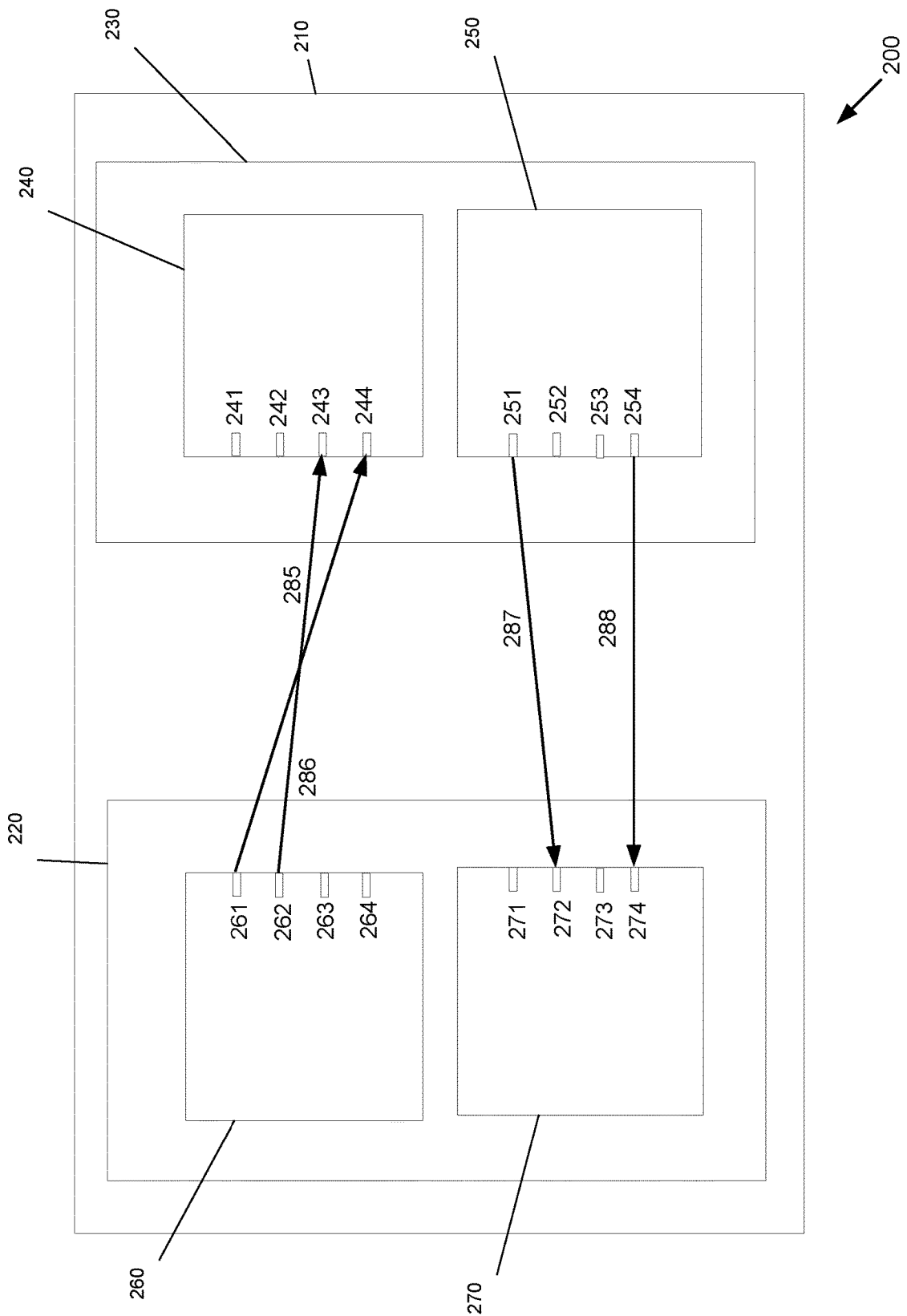
FIG. 2B illustrates a physical lane cross connection in accordance with embodiments the present disclosure.

Referring now to FIGS. 2A, and 2B, there is shown an example implementation of one or more cross connections 281, 282, 283, 284, 285, 286, 287, 288 being formed between a local device 220 and a peer device 230. As used herein, the term "cross-connection", may refer to a situation where a local device 220 having one or more modules 261, 262, 263, 264, 271, 272, 273, 274 and a peer device 230 having one or more modules 241, 242, 243, 244, 251, 252, 253, 254 are connected lane to lane. More precisely, a physical lane index X which may be used to represent any one of the modules 261, 262, 263, 264 (TX) OR 271, 272, 273, 274 (RX) on the local device 220 is connected to a physical lane index Y, which is used to represent any one of the modules 241, 242, 243, 244 (RX) OR 251, 252, 253, 254 (TX) respectively on the peer device 230. Hence, the cross connection between local device 220 and peer device 230 can represent any possible combination of physical receiver lanes and physical transmitter lanes being connected between the two devices 220, 230.

Normally, each of the cross connections 281, 282, 283, 284, 285, 286, 287, 288 would involve manually changing the wire combinations, which is a static process and thus requires multiple static interface connections to be established during verification. In contrast, embodiments of the verification process described herein introduce a single testbench 210 that utilizes script logic through which all applicable protocol scenarios can be verified for every possible cross connection combination along with its tracking and coverage. This helps to reduce the overall verification effort, which optimizes resources, and speeds up the rigorous regression necessary to identify corner-cases or specific scenario bugs.

As discussed above, in existing systems, the connection of lanes in a testbench is currently performed statically using manual editing. Thus, each connection combination will require a separate testbench. This implies a significant manual effort to cover just a few of the possible connection combinations for a test scenario. In practice, creating test benches for every conceivable connection combination for every conceivable test scenario is not feasible. In other words, these approaches require the testbench to be rewritten for each unique cross connection combination.

To address these issues, in some embodiments, verification process 10 utilizes a single testbench 210 and script logic (not shown) through which all applicable protocol scenarios may be verified for most or all possible cross connection combinations. This approach also introduces improvements for tracking and coverage. Embodiments of verification process 10 may be used in accordance with any interface, including, but not limited to serial interfaces such as DP/DN, which is discussed in further detail hereinbelow.

Figure 3:
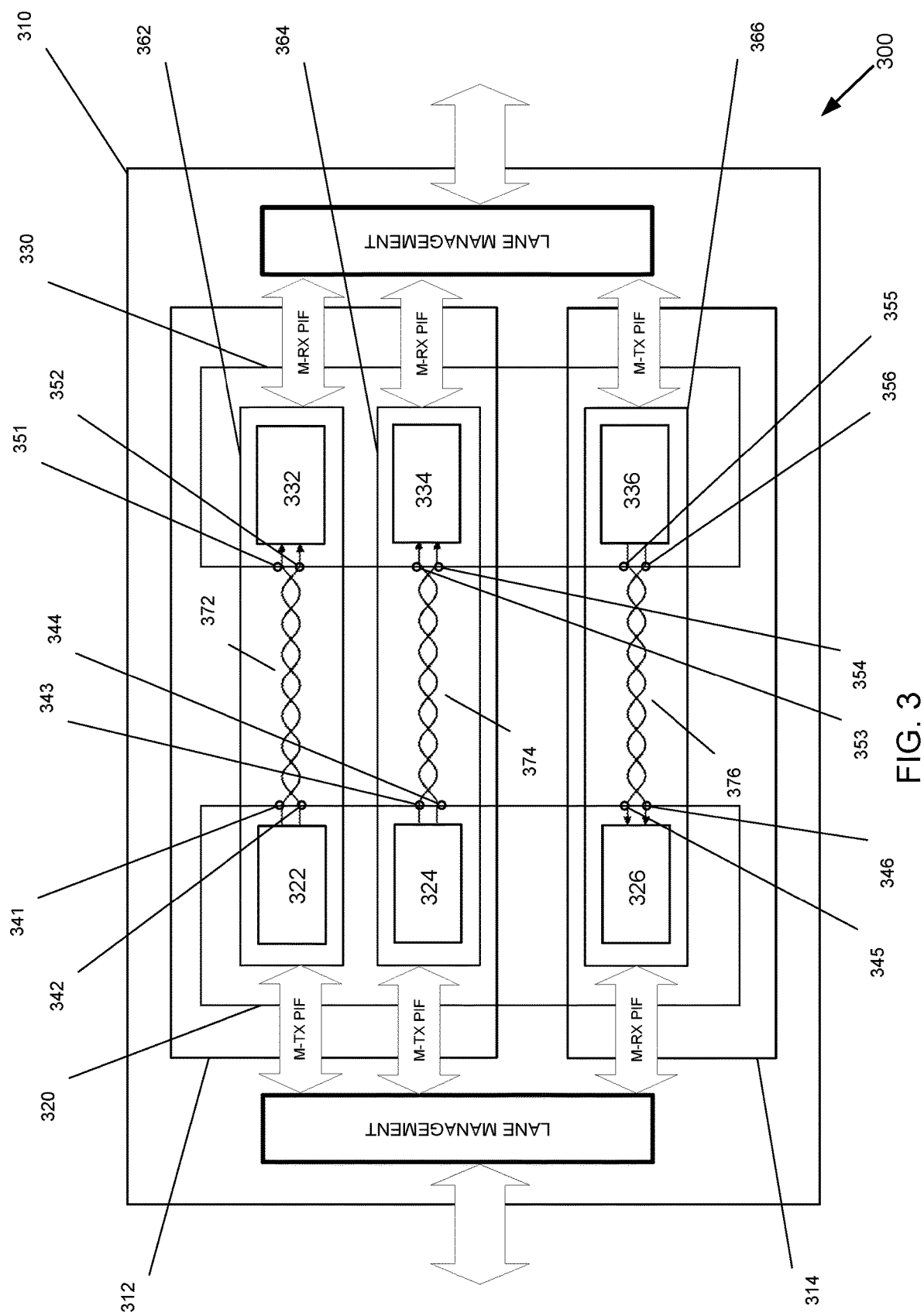
FIG. 3 illustrates a lane example in accordance with the MIPI M-PHY v5.0 specification.

Referring now to FIG. 3, an interface example 300 associated with the MIPI M-PHY v5.0 specification is provided. M-PHY is a high speed data communications physical layer protocol standard developed by the Mobile Industry Processor Interface "MIPI" Alliance. It should be noted that the term "lane", as used herein, may refer to a unidirectional, single-signal, physical transmission channel used to transport information from a module on one device to a module on another device. Most of today's protocols use high speed interconnects between the host and target device. These high-speed interconnects generally use differential signaling. Using differential signaling allows the effect of noise to be minimized on the signal that is being transferred. These signals usually have low voltages, which allow for high frequency transmission. In the interface example 300, local device 320 includes one or more modules 322, 324, 326, where modules 322, 324 act as transmitters and module 326 acts as a receiver. Similarly, peer device 330 includes one or more modules 332, 334, 336, where modules 332, 334 act as receivers and module 336 acts as a transmitter. Together, modules 322, 324, 326 on local device 320 and modules 332, 334, 336 on peer device 330 define Lanes 362, 364, 366 respectively. Please see Table 1 below for an illustration of this relationship between modules 322, 324, 326 on local device 320, and modules 332, 334, 336 on peer device 330 and the Lanes 362, 364, 366 they form when combined in interface example 300.

TABLE 1

| Modules on Local Device 320 | Modules on Peer Device 330 | Lanes defined by the combination of Modules |
|---|---|---|
| 322 | 332 | 362 |
| 324 | 334 | 364 |
| 326 | 336 | 366 |

Furthermore, each module 322, 324, 326, 332, 334, 336 includes a pair of pins that can be individually denoted as DP and DN, where DP is defined as the positive node of the differential signal and DN is the negative node. Table 2 below provides a more detailed breakdown of the pin assignments used in interface example 300.

TABLE 2

| Module | 322 | 324 | 326 | 332 | 334 | 336 |
|---|---|---|---|---|---|---|
| DP | 341 | 343 | 345 | 351 | 353 | 355 |
| DN | 342 | 345 | 346 | 352 | 354 | 356 |

In most of these cases, this interface is dual simplex, i.e., a pair of unidirectional sub-links 312, 314. For example, Lanes 362, 364 transmit from local device 320 to peer device 330, and Lane 366 transmits from peer device 330 to local device 320. A pair of DP/DN together forms a module, a point-to-point connection between a pair of modules form a Lane across devices and multiple Lanes can be created using a DPDN interface. Many protocols use this kind of interface, for example, peripheral component interconnect express (PCIe), universal serial bus 3.x (USB3.x), universal serial bus (USB4), MIPI protocols: M-PHY, D-PHY, etc.

In some embodiments, verification process 10 may be configured to perform cross-connections on various interfaces such as DP/DN. M-PHY uses a dual-simplex approach for data transfer where transmission and receipt of data can occur on different sets of Lanes. This may increase the number of possible cross-connections 372, 374, 376 between local device 320 and peer device 330 regardless of the direction of data flow. FIGS. 2A & 2B show cross connections 281, 282, 283, 284, 285, 286, 287, 288 between a host device-under-test 220 (DUT)/EDA simulation application and a peer device 230 EDA simulation application/DUT. In these examples, the DUT 220 and EDA simulation application 230 may be either the host or device. As used herein, the phrase "EDA simulation application" may refer to a virtual simulation tool used to test connectivity of the DUT with other devices.

Figure 4:
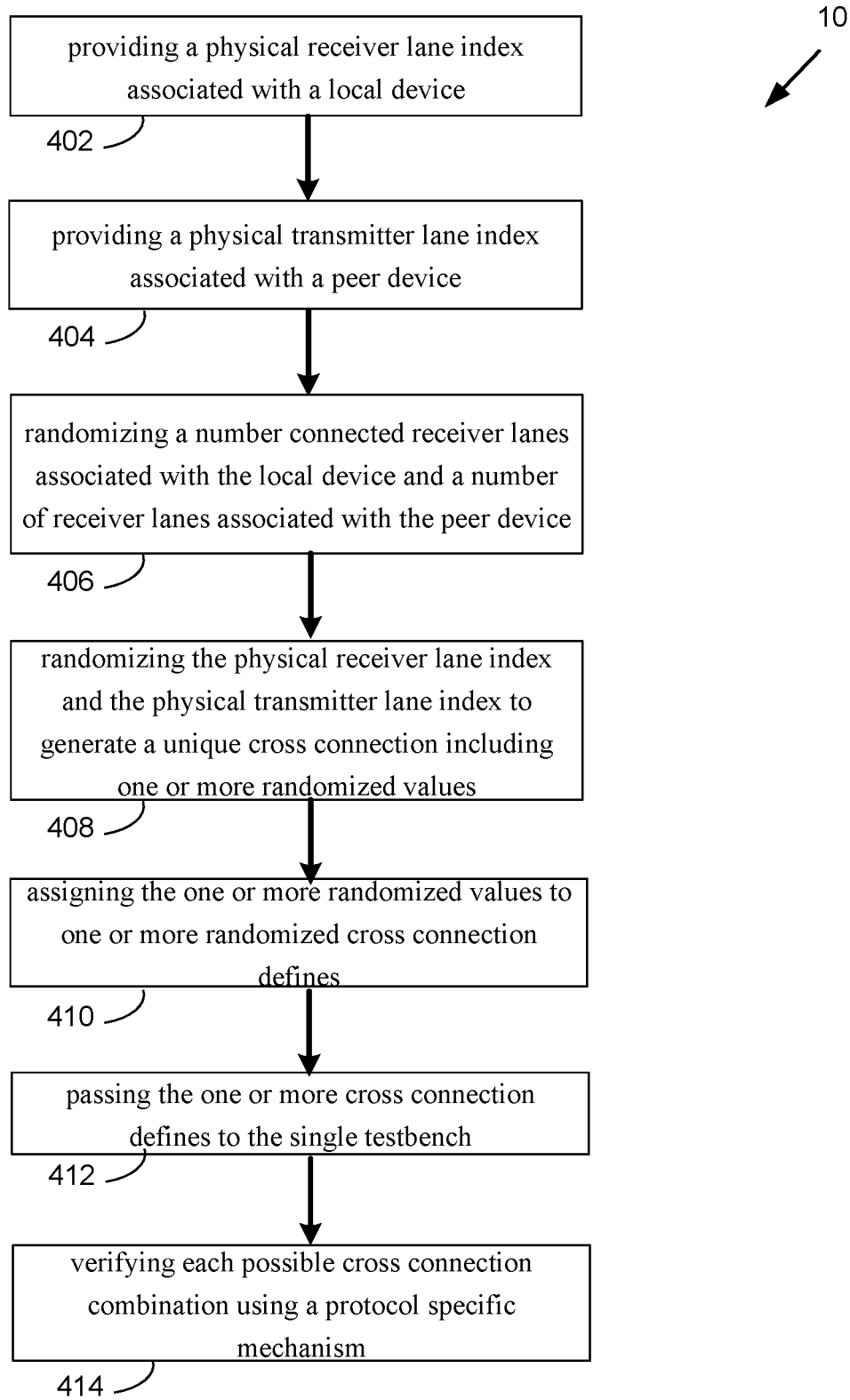
FIG. 4 is a flowchart of a verification process in accordance with the present disclosure.

Referring now to FIG. 4, a flowchart of the verification process 10 in accordance with the present disclosure is provided. As discussed above, the existing approaches to verification require separate test benches 210 and extensive manual effort to cover just a few of the possible connection combinations for each test scenario. In some embodiments, verification process 10 may be configured to perform verification on one or more cross-connections. The performance and functionality of a serial/parallel interface protocol depend on how supported physical lanes 261, 262, 263, 264, 271, 272, 273, 274 on the DUT 220 are connected to physical lanes 241, 242, 243, 244, 251, 252, 253, 254 on the peer device 230. In some embodiments, the distribution/merging of data on multiple Lanes (not shown) can depend on how the physical lanes 241, 242, 243, 244, 251, 252, 253, 254, 261, 262, 263, 264, 271, 272, 273, 274 are ordered and arranged. The first step 402 in verification process 10 involves providing a physical lane index associated with the local device 220 to influence the arrangement/ordering of the physical lanes 261, 262, 263, 264, 271, 272, 273, 274 on the local device 220. Likewise, the second step 404 in verification process 10 involves providing a physical lane index associated with the peer device 230 to influence the arrangement/ordering of the physical lanes 241, 242, 243, 244, 251, 252, 253, 254 on the peer device 230. A linear feedback shift register ("LFSR") seed for scrambling data to be transferred/received (for internal validation) may depend upon how the physical lanes are connected. In LFSR, a seed is a starting value used to initiate the LFSR. The same seed value may be used to initiate the LFSR when it is reset. Lane alignment and the addition of fillers also depend on physical lane connection information. The term "filler", as used herein, may refer to a unique 8-bit data symbol used when there is no data to be transmitted. Accordingly, the receivers may ignore the fillers when received. This helps in continuing the transmission without transitioning to a lower power state as well as provides Lane alignment when there is an unequal distribution of data among Lanes. In other protocols, a similar data symbol may be called PAD symbol. It should be noted that the metadata of the Lane connections may be obtained and stored for use in various aspects of verification process 10. Accordingly, the process included herein may verify the functionality of protocol scenarios for each possible cross connection combination.

In some embodiments, there may be multiple lane indexes assigned for any physical lane. Some of these may include, but are not limited to, a physical lane index and logical lane index. A physical lane index may be assigned from the lane name itself. For example, Lane X (not shown) may have a corresponding physical lane index as X. This may apply for both transmitters 250, 260, and receivers 230, 270. The logical lane index (not shown) may depend on the connection of a local Lane X to a peer Lane Y. Transmitter local Lane X may have a logical lane index as X, which may be the same as the physical lane index. However, receiver local Lane X connected to a transmitter peer Lane Y may have a logical lane index as Y.

In some embodiments, a number of connected receiver lanes associated with the local device and a number of connected receiver lanes associated with the peer device may be randomized as shown in step 406 of verification process 10. Furthermore, a physical local lane receiver index and physical peer transmitter lane index may be randomized in the run script as shown in step 408 of verification process 10, thus making a unique cross-connection 283, 284. In some embodiments, "cross-connecting" may refer to connecting wires, which is a static process. In this way, any randomization may be performed prior to simulation. Randomized values may be assigned to cross-connection defines as shown in step 410 of verification process 10. In Verilog, System Verilog (SV), and similar hardware description, verification, and programming languages, a "define" creates a macro for code/text substitution. This is essentially used to substitute commonly used pieces of code/text with meaningful names. Using script logic (not shown) these randomized cross-connection defines may be passed to the testbench 210 through a simulator command. These defines may be used in an EDA simulation application module or a virtual SV interface to connect with the testbench during instantiation.

In operation, verification process 10 analyzes receiver 270 of local device 220 and randomizes the number of connected lanes 272, 274. Verification process 10 can further include using script logic to randomize cross-connections 283, 284 by iterating through the maximum number of physical lanes available and then assigning a value for the cross connection defines. Likewise, the same script logic can be performed for receiver 240 of peer device 230.

The script logic dumps the generated randomized cross connection define to a file in a predetermined string format using any suitable approach. In embodiments, the script logic may be called from a parent script, which invokes a simulator. The parent script may perform a variety of functions, such as, calling the randomized cross connection generation script and dumping the generated cross connection define to a file in a specific string format.

Referring now to FIGS. 3 and 4, in some embodiments, one or more defines may be passed through a simulation command, which in turn, may be used to connect DPDN wires 341, 342, 343, 344, 345, 346, 351, 352, 353, 354, 355, 356 in the testbench 310 as shown in step 412 of verification process 10. Then each possible cross-connection 372, 374, 376 can be validated through a protocol-specific mechanism as shown in step 414 of verification process 10. The randomized cross-connection approach ensures covering most or all possible connection combinations through a single testbench 310, where coverage collection of each possible connection combination, for various scenarios to track EDA simulation application/DUT operation, is done through a protocol-specific parameter or test ID.

In some embodiments, verification process 10 may allow for the validation of cross connections through a protocol-specific mechanism. A link startup sequence (LSS) may be employed that may involve a trigger pattern exchange between both sides that contain information regarding lane connection. This robust mechanism ensures that LSS would fail (EDA simulation application checkers or LSS timeout) if the selected cross-connection is not valid/improper. Additionally and/or alternatively, score-boarding may be employed, where segments, packets, and frames from both sides are compared. The process may report an error if the selected cross-connection is not successful.

In some embodiments, verification process 10 may perform coverage collection through a protocol-specific parameter. In this way, script logic can be used to define a data structure to store the metadata of the cross connection reflecting its coverage for various protocol scenarios. The value of a protocol-specific parameter may then be sampled in whole or in part during the simulation so that this value may be assigned to the defined data structure by further script logic. In other embodiments, cyclic randomization may be used to avoid repetition of a previously verified cross-connection combination. The script logic can also execute cyclic randomization logic to ensure that the simulator is invoked only if a unique cross connection combination is generated.

In some embodiments of verification process 10, script logic can pass the randomized unique cross connection defines to the testbench through a simulation command. Furthermore, these randomized unique cross connection defines can be used in the testbench for instantiation of an EDA simulation application module/virtual SV interface that connects the testbench to an EDA application. This interface allows for communication between the testbench and the EDA application.

In some embodiments, verification process 10 uses a top-level script that monitors the number of simulator runs as required. A script can be iteratively called from this top-level script until the number of simulator runs requiring generation of unique cross connection each time is completed. In other words, the top-level script calls the randomized cross-connection generation script and invokes the simulator based on cyclic randomization.

In some embodiments, verification process 10 may validate the randomized cross-connection using any suitable approach. A Link Startup Sequence (LSS), for example, may include a trigger pattern exchange between both sides which may include information regarding lane connection. This robust mechanism ensures that LSS would fail (e.g., EDA simulation application checkers or LSS timeout) if the selected cross-connection is not valid. Additionally and/or alternatively, score-boarding may be employed where segments, packets, and/or frames from both sides may be compared. The process may report an error if a selected cross-connection is not successful. Score-boarding may involve sequentially storing packets that have been transmitted and received on both sides and then comparing them to one another in order to determine if any error occurred while transmitting and receiving. For example, if packets 1-5 are to be transmitted from local device 220 to peer device 230 as shown in FIGS. 2A and 2B, then all 5 packets may be stored in a queue for transmitter 260 for local device 220 before transmitting. Then, on the other side, all 5 packets may be stored in a queue for receiver 240 for peer device 230 after receiving. The testbench 210 can then compare packets in both queues. This comparison ensures that any error during data transmission and data receipt can be identified on both sides by local device 220 and peer device 230, which relates to cross connection.

In some embodiments, the randomization approaches of verification process 10 may provide numerous advantages over existing sequential techniques. For example, embodiments of verification process 10 may be divided into multiple steps, thus increasing modularity which helps in optimizing part(s) of the process more easily. With regard to the scope of variability of connections, verification process 10 may provide more variability for running a fixed number of simulations. That is, there is a higher probability of going through a different set of combinations every time a fixed number of simulations are run. With regard to EDA simulation application/DUT bug finding for a fixed number of simulations, verification process 10 is more likely to locate corner-case/specific scenario bugs through a single regression.

In some embodiments, verification process 10 may provide an option for covering the most cross connection combinations or all cross connection combinations. The approach of randomized cross-connections may be used to cover either most, or all, possible cross combinations. In both cases, the number of simulator runs may be equal to the number of required unique cross connections to be covered. The "all possible" cross connection option may be used when there is no scope for directed verification. Alternatively, the "most possible" cross connection option may be used in which the randomization approach helps in covering around 90% of all possible cross connection combinations quickly and the rest of the combinations can be covered using directed verification. The feasibility of the most possible cross connection option increases exponentially in proportion to the number of maximum lanes. As such, the number of unique cross connections increases considerably through a relatively small increase in the number of maximum lanes. For example, the number of unique cross connections is 36 when the number of maximum lanes is 2; whereas it is 4096 when the number of maximum lanes is 4. Covering all 4096 unique cross connection combinations through randomization may not be feasible, given the length of time taken to generate each unique combination. Hence, most of the 4096 unique cross connection combinations are rapidly covered through randomization and the rest of these may be covered through directed verification.

In some embodiments, verification process 10 may verify an EDA simulation application/DUT rigorously through optimized effort. The approach of randomized cross-connection ensures covering most or all possible connection combinations through a single test bench. This significantly reduces the effort of the verification engineer, allowing them to fully focus on verifying the EDA simulation application/DUT through abstract levels of test sequence writing. The result of this process is a rigorous verification of EDA simulation application/DUT functionality through which many unknown EDA simulation application/DUT bugs can be captured, including corner cases related to data sampling for various cross-connection combinations.

In some embodiments, script logic defines the data structure to store the metadata of cross connections reflecting its coverage for various protocol scenarios. Additionally, EDA simulation application/DUT operation with various cross-connections can be tracked through its coverage. Script logic can make use of a protocol-specific parameter to sample the coverage of cross connections during simulation, such that the value of this protocol specific parameter can be assigned to the defined data structure in whole or in part.

As discussed above, verification process 10 may utilize improved randomization logic to make it cyclic. The process may avoid any repetition of cross-connection combinations for multiple test cases/regression. A top-level script may be used to monitor and ensure non-repetition as it involves sampling one or more covered combinations from different simulations. Embodiments included herein are scalable and applicable to other EDA simulation application/DUTs as well as tools which use serial/parallel interface and cross-connection on physical lanes.

In some embodiments, verification process 10 may perform coverage tracking for verification. A protocol specific parameter or test ID may be used to track coverage of a cross connection for a particular scenario verification. As discussed above, coverage collection through protocol-specific parameter may be achieved by defining a data structure to store the metadata of cross connection reflecting its coverage for various protocol scenarios. The value of a protocol-specific parameter may then be sampled during simulation so that the whole or parts of this value may be assigned to the defined data structure. With regard to EDA simulation application/DUT bug finding, randomization logic may be used in a script to ensure rigorous verification. Corner-case/specific scenario bugs may be easily found through a single regression. It should be noted that verification process 10 may be scalable to other EDA simulation application/DUTs, including any tools which use serial/parallel interfaces and cross-connection on physical lanes.

It will be apparent to those skilled in the art that various modifications and variations can be made to verification process 10 and/or embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A method for verifying a cross-connection of one or more lanes in a multi-lane environment using a single testbench, comprising:
   providing a physical receiver lane index associated with a local device having one or more receiver lanes;
   providing a physical transmitter lane index associated with a peer device having one or more transmitter lanes;
   randomizing a number of connected receiver lanes associated with the local device and a number of connected receiver lanes associated with the peer device;
   randomizing the physical receiver lane index and the physical transmitter lane index to generate a unique cross connection including one or more randomized values;
   assigning the one or more randomized values to one or more randomized cross connection defines;
   passing the one or more randomized cross connection defines to the single testbench; and
   verifying at least one cross connection using a protocol specific mechanism.

2. The method of claim 1, wherein the multi-lane environment includes a serial/parallel interface allowing one or more cross-connections.

3. The method of claim 2, wherein passing the one or more randomized cross connection defines includes connecting at least one wire at the single testbench.

4. The method of claim 1, wherein randomizing the physical receiver lane index and the physical transmitter lane index includes cyclic randomization.

5. The method of claim 1, further comprising:
   providing an option to handle, from the at least one cross connection, either all possible cross connections or most possible cross connections.

6. The method of claim 1, wherein a protocol specific parameter is used to track coverage of a cross connection for a particular scenario verification.

7. A method for verifying a cross-connection of one or more lanes in a multi-lane environment using a single testbench, comprising:
   providing a physical receiver lane index associated with a local device having one or more receiver lanes, wherein each lane in the physical receiver lane index is a unidirectional, single-signal, physical transmission channel used to transport information between two points;
   providing a physical transmitter lane index associated with a peer device having one or more transmitter lanes, wherein each lane in the physical transmitter lane index is a unidirectional, single-signal, physical transmission channel used to transport information between two points;
   automatically randomizing a number of connected receiver lanes associated with the local device and a number of connected receiver lanes associated with the peer device;

automatically randomizing the physical receiver lane index and the physical transmitter lane index to generate a unique cross connection including one or more randomized values;

automatically assigning the one or more randomized values to one or more randomized cross connection defines;

passing the one or more randomized cross connection defines to the single testbench; and verifying at least one cross connection using a protocol specific mechanism.

8. The method of claim 7, wherein the multi-lane environment includes a serial/parallel interface allowing one or more cross-connections.

9. The method of claim 8, wherein passing the one or more randomized cross connection defines includes connecting at least one wire at the single testbench.

10. The method of claim 7, wherein randomizing the physical receiver lane index and the physical transmitter lane index includes cyclic randomization.

11. The method of claim 7, further comprising:
providing an option to handle, from the at least one cross connection, either all possible cross connections or most possible cross connections.

12. The method of claim 7, wherein a protocol specific parameter is used to track coverage of a cross connection for a particular scenario verification.

13. A system for verifying a cross-connection of one or more lanes in a multi-lane environment using a single testbench, comprising:
a local device having one or more receiver lanes and a physical receiver lane index associated therewith;
a peer device having one or more transmitter lanes and a physical transmitter lane index associated therewith; and
at least one processor configured to randomize a number of connected receiver lanes associated with the local device and a number of connected receiver lanes associated with the peer device, the at least one processor further configured to randomize the physical receiver lane index and the physical transmitter lane index to generate a unique cross connection including one or more randomized values, the at least one processor further configured to assign the one or more randomized values to one or more randomized cross connection defines, the at least one processor further configured to pass the one or more randomized cross connection defines to the single testbench and to verify at least one cross connection using a protocol specific mechanism.

14. The system of claim 13, wherein the multi-lane environment includes a serial/parallel interface allowing one or more cross-connections.

15. The system of claim 14, wherein passing the one or more randomized cross connection defines includes connecting at least one wire at the single testbench.

16. The system of claim 13, wherein randomizing the physical receiver lane index and the physical transmitter lane index includes cyclic randomization.

17. The system of claim 13, wherein a protocol specific parameter is used to track coverage of a cross connection for a particular scenario verification.

* * * * *